United States Patent [19]

Crutzen et al.

[11] 4,384,489

[45] May 24, 1983

[54] METHOD OF MONITORING STORED NUCLEAR FUEL ELEMENTS

[75] Inventors: Serge Crutzen, Orino; Claude Vinche, Arolo; Elie Borloo, Leggiuno; Wilhelm Buergers, Brebbia, all of Italy

[73] Assignee: European Atomic Energy Community (EURATOM), Luxembourg, Luxembourg

[21] Appl. No.: 138,348

[22] Filed: Apr. 8, 1980

[30] Foreign Application Priority Data

Apr. 24, 1979 [GB] United Kingdom ............... 7914206

[51] Int. Cl.$^3$ ............................................. G01N 29/00
[52] U.S. Cl. ...................................... 73/602; 376/249
[58] Field of Search ............ 73/602, 594; 176/19 LD; 250/506, 507; 376/249

[56] References Cited

U.S. PATENT DOCUMENTS 4,104,618  8/1978  Towsend .
4,123,748 10/1978  Otani .
4,128,011 12/1978  Savage .................................. 73/594

FOREIGN PATENT DOCUMENTS 2389166  8/1972  France .
1241287  7/1974  United Kingdom .

OTHER PUBLICATIONS

Crutzen, S. J., et al., "Application of Tamper-Resistant Identification and Sealing Techniques for Safeguards", pp. 305–338.

Primary Examiner—Anthony V. Ciariante
Attorney, Agent, or Firm—Stevens, Davis, Miller & Mosher

[57] ABSTRACT

To monitor a nuclear fuel element or fuel elements located in a store, e.g. a pond in a swimming pool reactor, the store is illuminated ultrasonically using one or more transducers transmitting ultrasonic signals in one or more predetermined directions to obtain an output which, because it depends on the number and relative location of the fuel elements in the store, and the structure of the store itself is distinctive to the fuel elements or elements stored therein. From this distinctive output is derived an identity unique to the stored fuel element or elements and a reference signal indicative of the whole structure when intact, the reference signal and identity being recorded. Subsequent ultrasonic testing of the store and its contents under identical operating conditions produces a signal which is compared to the recorded reference signal and if different therefrom reveals the occurrence of tampering with the store and/or the fuel element or elements.

4 Claims, 2 Drawing Figures

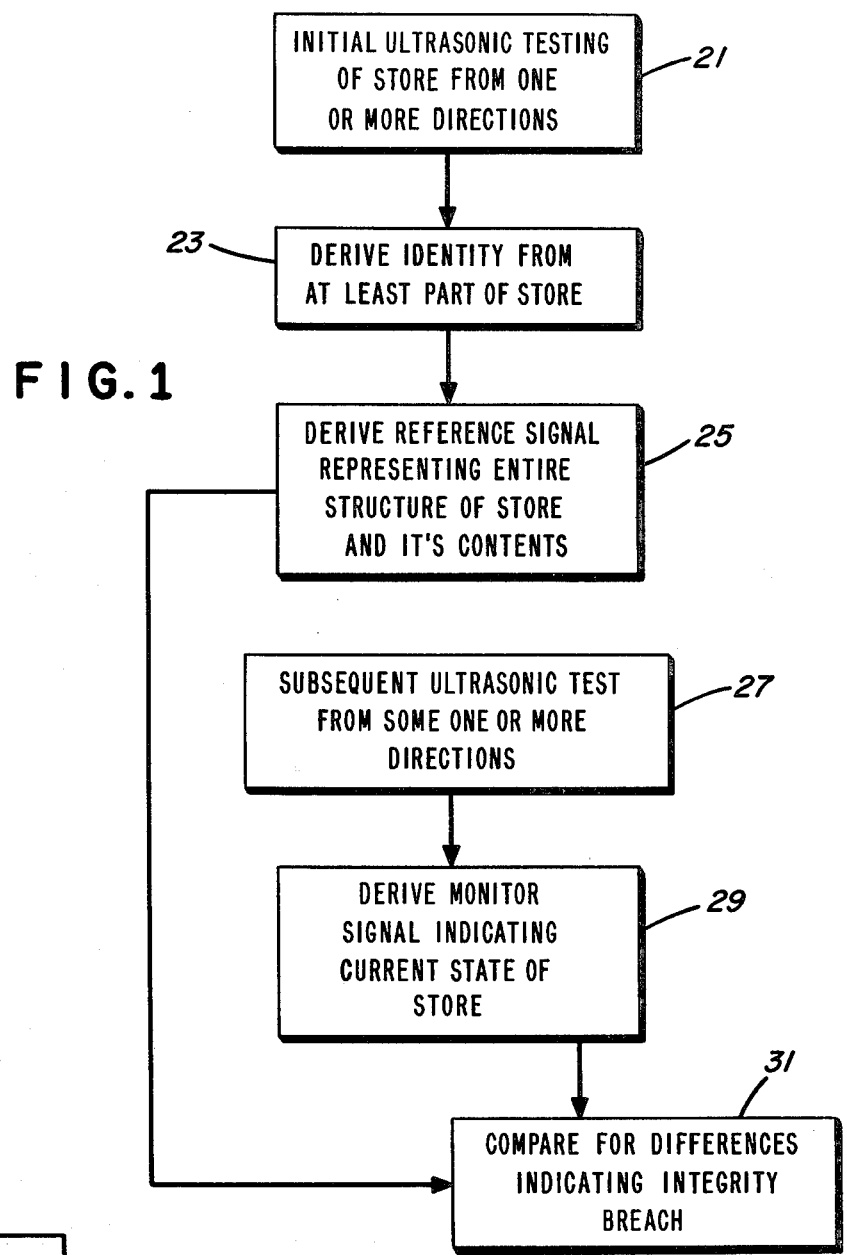
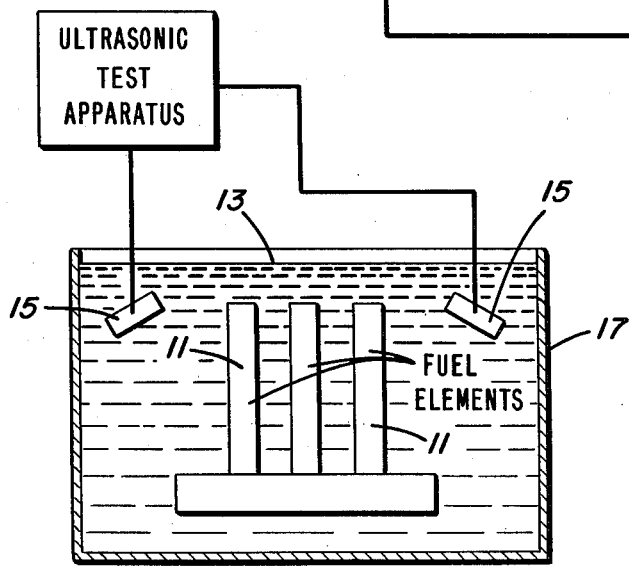

METHOD OF MONITORING STORED NUCLEAR FUEL ELEMENTS

The invention relates to a method of monitoring stored nuclear fuel elements, in order to maintain a check that there has been no tampering with the fuel elements during their storage.

The Treaty of Non Proliferation makes it necessary to maintain such a control of the fuel elements used in nuclear power or research reactors, from their manufacture to the reprocessing stage. The identification and control of each fuel element is preferably performed from a remote location, and should not require any structural modifications to the fuel element each time it is identified, for security reasons.

In many cases, for example in a swimming pool reactor, nuclear fuel elements are stored under water in a pond, so that the identification and control of the stored fuel elements in such instances should be automatic and not require physical handling of the fuel elements.

One way of identifying fuel elements is to apply an identifying seal to each element or bundle of elements, for example by welding or mechanical fastening, the identifying seal being then used not only to identify the element or bundle of elements, but also by its own integrity, to monitor the integrity of the element or bundle of elements sealed thereby. This method of controlling the fuel elements poses several problems. For example, it is often necessary to modify the structure of the element or bundle of elements in order to fasten the identifying seal thereto, and the consequent physical alteration may not be such as to promote the security of the fissile material thus sealed. Frequently, to monitor the fissile material thus sealed, it is ultrasonically tested, and previously the transducer or transducers performing such testing must be very carefully positioned relative to the identifying seal on the fuel element or bundle of elements, and this disposition of the transducer or transducers must not vary from one testing operation to the next, in order to ensure that the output achieved for each operation is a true ultrasonic "picture" of the identifying seal, and that any difference in the output received from subsequent testing operations represents the occurrence of a breach in the integrity of the identifying seal, i.e. tampering with the identifying seal. Moreover, the type of identifying seal used must be compatible with the quality standard of the fuel element or bundle of elements to which it is fixed, and must also be capable of tolerating the level of radiation it is likely to encounter when attached to the fuel elements. It is possible that the application of the identifying seal to the fuel element or bundle of fuel elements, and also its subsequent removal when safeguarding is no longer required, may damage the fuel elements.

According to the present invention, there is provided a method of monitoring stored nuclear fuel elements comprising the steps of initially testing ultrasonically a nuclear fuel element store from at least one predetermined direction; deriving from the output produced thereby a distinctive identity for that store determined by the structure of at least a predetermined part of the store, and also deriving from said output a reference signal indicative of the whole structure of the store and its contents when the integrity thereof is intact; subsequently tested ultrasonically the store from said predetermined direction or directions to derive thereby a monitor signal indicative of the current state of the integrity of the store; and comparing the reference and monitor signals to discover from any difference therebetween the occurrence of a breach in the integrity of the store.

Thus, the invention provides a method in which there is no need to provide individual identifying seals for each element or bundle of elements, and to scan such identifying seals individually in order to check on the integrity of the elements themselves. Instead, it is merely necessary to place one or more fuel elements in a suitable store, for example a pond, in any convenient configuration. The structure of the store and its contents which is subsequently ultrasonically tested is sufficiently complex to permit a substantial number of differentiated echoes depending on the structural material encountered by the ultrasonic waves, their geometrical form, and on the intervening presence of ultrasonically reflecting surfaces. As a result, the set of echoes derived from an ultrasonic illumination of a particular store will tend to be unique to that store, and can be used to derive a distinctive identity for that store, and hence for its contents. If, during subsequent ultrasonic illumination of the store, the output obtained differs from that previously recorded, it can be readily deduced that in the intervening period, there has been some breach in the integrity of the store, i.e. tampering therewith, and/or tampering with one or more of the fuel elements stored therein.

FIG. 1 shows the method of the invention; and,
FIG. 2 shows the structures used in carrying out the method.

A particular embodiment of the invention will now be described, by way of example.

As discussed above, nuclear fuel elements 11 (FIG. 2) are preferably stored in batches under water 13 in a pond 17, in a convenient configuration therein. The water in the pond can be regarded as a matrix in which are embedded in a random configuration foreign "inclusions" constituted by the fuel elements themselves. The pond containing the fuel elements is then ultrasonically illuminated (step 21, FIG. 1) using one or more piezo electric crystal transducers 15, 17 disposed to transmit ultrasonic signals into the pond in one or more predetermined directions. If the resulting output is viewed on an oscilloscope, it will exhibit a series of peaks, indicative of the structure of the pond, and the relative locations of the fuel elements located therein. If the pond is ultrasonically illuminated a second time under the same working conditions using the same transducers operating in the same direction or directions, then the second output will be identical to the first output obtained, provided that there has been no tampering either with the pond structure and/or with the fuel elements themselves. Accordingly, the output achieved from the first ultrasonic test can be taken as being unique to the fuel elements currently stored in the pond. At least a part of this distinctive signal is translated into a digital or analog code and recorded ready for use subsequently by remote telemetering equipment to identify (step 23, FIG. 1) this particular store amongst a plurality of similar stores so that this particular store can be monitored. Also recorded (step 25, FIG. 1) whether in digital or analog form, is the whole signal obtained from the initial ultrasonic test, since this is indicative of the ultrasonic "picture" to be obtained every time the pond is illuminated ultrasonically under identical working conditions, provided that there has been no tampering with either the structure of the pond and/or the fuel elements themselves.

It should be noted that of course the identity derived for the pond and its contents is not only dependent on the structure thereof, but also on the operating frequency and other inherent characteristics of the transducer 15 or transducers 15, 17 used to test the pond's integrity. For example, if more than one transducer is used, they may have different operating frequencies, in order to make the derived identity for the pond yet more distinctive.

The same procedure can be repeated for a number of such ponds, at any number of locations, the identity of each pond and its contents, and the signals to be obtained by illuminating each pond ultrasonically in the absence of any tampering being recorded at a suitably placed control station. Then after, it is possible to monitor the current status of the contents of any of these ponds, by initiating an ultrasonic test (step 27, FIG. 1) of that pond using its identification code, obtaining an output representing the current state of the pond (step 29, FIG. 1) and comparing (step 31, FIG. 1) the output obtained with the reference signal recorded with this code. In other words, the contents of a particular pond can be monitored from a remote control unit, via existing communication lines, for example telephone lines, whether automatically or selectively.

The method according to the invention has the advantage of being independent of prevalent conditions at the site of the pond, for example the quality of the lighting available, the temperature of the water, or of the level of radiation. Moreover, once the fuel rods are disposed within the pond, the subsequent monitoring can be fully automated and certainly does not require any manipulation of the fuel elements within the pond, nor the structural alteration of any of the fuel elements, because the physical structure and particular location of the fuel element within the pond determines its identity so far as the control unit is concerned. The distance to be travelled under water by an ultrasonic signal before it encounters one of the fuel elements within the pond is immaterial, and may be several meters without affecting the output to be obtained and hence the quality of the identity signal and reference signals recorded at the control unit.

We claim:

1. A method of monitoring stored nuclear fuel elements to determine a breach of the store comprising the steps of
   initially testing ultrasonically a nuclear fuel element store from at least one predetermined direction;
   deriving from the output produced thereby a distinctive identity for that store determined by the structure of at least a predetermined part of the store, and also deriving from said output a reference signal indicative of the whole structure of the store and its contents when the integrity thereof is intact;
   subsequently testing ultrasonically the store from said predetermined direction or directions to derive thereby a monitor signal indicative of the current state of the integrity of the store; and
   comparing the reference and monitor signals to discover from any difference therebetween the occurrence of a breach in the integrity of the store.

2. A method as claimed in claim 1, in which the initial and subsequent ultrasonic testing of the store is performed using two or more transducers.

3. A method as claimed in claim 2, in which the transducers used have different operating frequencies.

4. A method as claimed in claim 1, in which the subsequent ultrasonic testing of the store is repeated at selected intervals thereby to provide an intermittent indication of the current state of the integrity of the store.

* * * * *